United States Patent Office 3,117,964
Patented Jan. 14, 1964

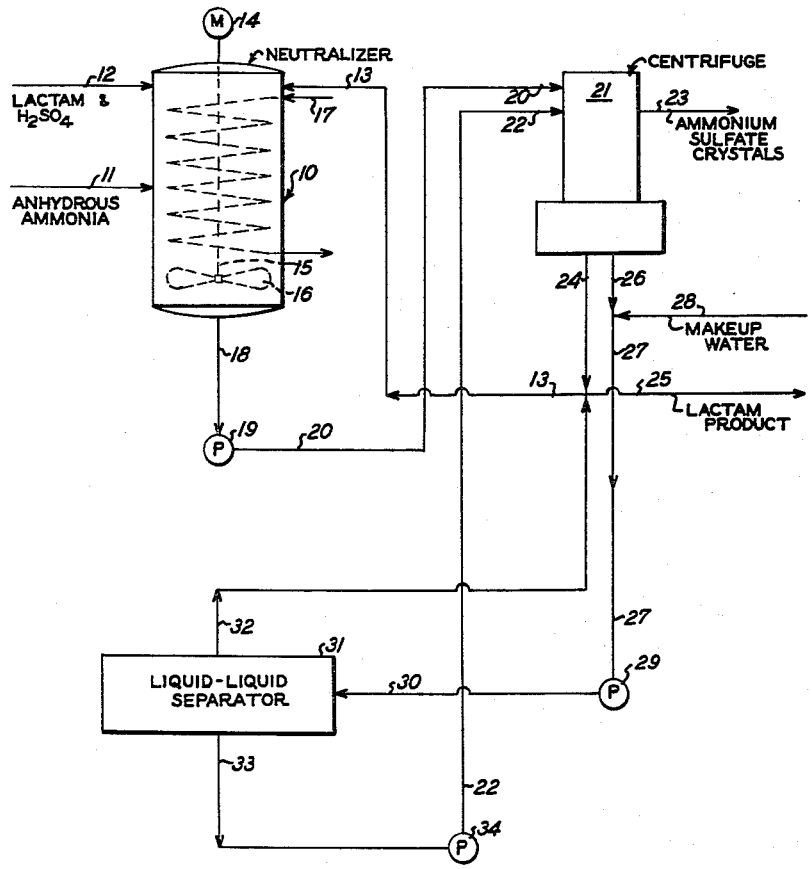

3,117,964
PROCESS OF SEPARATING LACTAMS FROM CONCENTRATED SULFURIC ACID SOLUTIONS BY NEUTRALIZATION WITH AMMONIA
Lester Nirenberg, Brooklyn, N.Y., assignor to Halcon International, Inc., a corporation of Delaware
Filed Jan. 4, 1962, Ser. No. 164,281
9 Claims. (Cl. 260—239.3)

This invention relates to processes for the recovery of a lactam from a mixture thereof with concentrated sulfuric acid, more particularly to such processes for the recovery of caprolactam from a mixture by neutralization of the sulfuric acid with ammonia in the presence of excess caprolactam, and especially to such processes wherein concentrations are regulated so that the reaction mixture forms a solid ammonium sulfate phase, a liquid phase which is predominantly caprolactam, separating the solid and the liquid phases, and recycling part of the liquid phase to the neutralization reaction step. It also relates to separation of caprolactam from a water solution thereof by phase separation at elevated temperatures.

In a known process for the preparation of a lactam such as caprolactam, the corresponding ketoxime is arranged in the presence of concentrated sulfuric acid at about 80° to 130° C. to give a mixture of the latter acid with the lactam. The lactam may be recovered by substantial neutralization of the reaction mixture with aqueous ammonia followed by separating an aqueous lactam phase from an aqueous ammonium sulfate phase. The latter may be concentrated in order to recover solid ammonium sulfate; and it may be desirable to subject it to benzene extraction to recover the lactam therein. However, this is undesirable from the economic viewpoint due to the high heat costs and also the complexity of the procedure. The art is confronted by the problem of providing a more efficient process for recovering lactams.

The discoveries associated with the invention and relating to the solution of the above problems, and the objects achieved in accordance with the invention as set forth herein include the provision of:

A process for recovering a lactam from a mixture thereof with sulfuric acid which comprises treating the mixture with anhydrous ammonia, separating from the resulting mixture a solid ammonium sulfate phase and a lactam rich liquid phase, and recycling at least a part of the latter to the treating step;
Such a process wherein the initial lactam is mixed with 100% sulfuric acid;
Such a process wherein the recycled lactam contains substantially no ammonium sulfate;
Such a process wherein the initial lactam mixture contains 5% oleum;
A process for separating a mixture of caprolactam and water which comprises separating a lactam-rich phase and a water-rich liquid phase at elevated temperatures;
Such a process wherein the solid ammonium sulfate is given a wash with water whereby the lactam content thereof is brought within the maximum of 0.5%;
Such a process wherein caprolactam is separated from the wash liquid by separating lactam rich liquid phase therefrom at elevated temperatures and at a pressure sufficient to maintain two liquid phases in the system;
Such a process wherein the temperature is in the range of 150° to 445° F.;
Such a process wherein the temperature is about 285° F.;
And other objects which will be apparent as details or embodiments of the invention are set forth hereinafter.

The accompanying drawing is a schematic flow diagram of a preferred embodiment of the invention.

In order to indicate still more fully the nature of the present invention the following examples of typical procedures are set forth in which parts and percents mean parts and percents by weights, respectively unless otherwise indicated, it being understood that these examples are presented as illustrative only and they are not intended to limit the scope of the invention.

*Example 1*

Referring to the drawing, into the neutralizer 10 anhydrous ammonia is fed (1260 lbs./hr.) via line 11, a mixture of caprolactam (2650 lbs./hr.) and 100% sulfuric acid (3630 lbs./hr.) via line 12, and recycled caprolactam (41,900 lbs./hr.) via line 13. The mixture is reacted at 285° F. and substantially neutralized, with agitation. The neutralizer is equipped with agitation means such as a motor 14, shaft 15, and agitator blades 16. As the reaction is exothermic, the neutralizer is provided with a cooling coil through which cooling water is passed via line 17, to maintain the desired temperature. Other cooling means may be used.

The resulting reaction mixture is passed via line 18, pump 19 and line 20 to centrifuge or separator 21. The solid ammonium sulfate phase is separated therein. The solid ammonium sulfate is given a wash with water introduced via line 22; then it is removed via line 23. It may be dried and marketed for use as fertilizer. The water-washed solid ammonium sulfate product contains not over 0.5% lactam.

Caprolactam is withdrawn from centrifuge 21 via line 24. A portion thereof is recycled to neutralizer via line 13. The remainder (discharged via line 25) is the major portion of the caprolactam product. The wash liquids separated in the centrifuge 21 are passed via line 26 to line 27 where they are combined with make-up water from line 28. Make-up water is added at this point to prevent precipitation of ammonium sulfate. Following this, the combined streams are passed via pump 29 and line 30 to phase separator 31 from which a lactam phase is removed via line 32, combined with the caprolactam in line 25 and discharged as product via line 25. The aqueous phase is removed from phase separator 31 via line 33, pump 34 and it is returned via line 22 to the centrifuge 21. The wash liquor recycled to the centrifuge 21 contains about 3% caprolactam, at most; but this is kept at a minimum. In this way, the by-product ammonium sulfate is substantially free of lactam and yet the process avoids such costly and undesirable procedures as benzene extraction. The lactam is recovered in good yield and is substantially free of ammonium sulfate; it may be purified readily in known manner.

The liquid-liquid separation in separator 31 is carried out at about 285° F. Other temperatures may be used in the range of 153° to 445° F., and the pressure should be sufficient to maintain the two liquid phases in the system. This is markedly superior to distillation methods, from the economic viewpoint.

The neutralization reaction may be carried out at any convenient temperature including that at which the liquid-liquid separation is carried out, with comparable pressures, although the neutralization reaction is not pressure dependent.

The amount of recycled caprolactam introduced into the neutralizer is about 6 times the total weight of other materials introductd therein. This range may vary from about 3 up to about 8 or more, the amount being selected to give the desired fluidity in the reaction mixture.

The amount of water introduced is substantially balanced by that removed with the ammonium sulfate crystals and the lactam.

An essential feature of the process is that the net input of ammonium sulfate in the system appears substantially in the solid phase, and is removed by centrifuging or equivalent separation procedures. This process avoids costly evaporation of water to form solid ammonium sulfate; also it avoids high temperature heat transfer difficulties due to the high viscosities which would be involved therein.

*Example 2*

The above procedure is repeated, except that the neutralizer lactam feed contains 5% oleum (and water is added), and similar results are obtained. The water is consumed in reacting with oleum.

Comparable results to the foregoing are achieved with various modifications thereof, including the following: Any lactam plus sulfuric acid mixture may be processed in accordance with the invention providing it has a ternary phase diagram relationship wherein ammonium sulfate forms a solid phase and the liquid material forms a lactam rich phase. Of the known ratios of acid to lactam, the lower ones are preferred. The lactams obtained from oximes of 6 to 11 carbon atoms are preferred. Examples of such lactams and the related oximes are caprolactam and cyclohexanone oxime, oenantholactam and cycloheptanone oxime, omega-aminooctylic acid lactam and cyclooctanone oxime, omega-aminononylic acid lactam and cyclononanone oxime, omega-amino-decylic acid lactam and cyclodecanone oxime, omega-amino-undecylic acid lactam and cycloundecanone oxime.

The feed streams and the recycle stream may be fed directly to the neutralizer, if desired. Any stream or mixture may be pre-cooled, if desired before it enters the neutralizer. Any sequence for separation of solid and liquids may be used.

In view of the foregoing disclosures, variations and modifications thereof will be apparent to one skilled in the art, and it is intended to include within the invention all such variations and modifications except as do not come within the scope of the appended claims.

What is claimed is:

1. In a process for recovering a lactam from a mixture thereof with sulfuric acid, the improvement which comprises treating said mixture with anhydrous ammonia in the presence of added lactam, separating from the resulting mixture a solid ammonium sulfate phase and a lactam rich liquid phase, and recycling at least a part of the lactam rich liquid phase to the treating step.

2. A process of claim 1 wherein the initial lactam is mixed with 100% sulfuric acid.

3. A process of claim 1 wherein the recycled lactam contains substantially no ammonium sulfate.

4. A process of claim 1 wherein the initial lactam mixture contains 5% oleum.

5. In a process for separating a mixture of caprolactam and water the improvement which comprises separating said mixture into a lactam-rich phase and a water-rich liquid phase at elevated temperatures.

6. A process of claim 1 wherein the solid ammonium sulfate is given a wash with water whereby the lactam content thereof is brought within the maximum of 0.5%.

7. A process of claim 6 wherein caprolactam is separated from the wash liquid by separating lactam rich liquid phase therefrom at elevated temperatures and at a pressure sufficient to maintain two liquid phases in the system.

8. A process of claim 7 wherein the temperature is in the range of 153° to 445° F.

9. A process of claim 8 wherein the temperature is about 285° F.

References Cited in the file of this patent

UNITED STATES PATENTS 2,605,261  Kahr _____ July 29, 1952

FOREIGN PATENTS 667,075  Great Britain _____ Feb. 27, 1952
458,387  Italy _____ July 10, 1950